United States Patent [19]

Morita et al.

[11] Patent Number: 5,119,008
[45] Date of Patent: Jun. 2, 1992

[54] BATTERY CHARGING APPARATUS

[75] Inventors: Hideyo Morita, Sumoto; Syouiti Toya, Hyogo, both of Japan

[73] Assignee: Sanyo Electric Co., Ltd., Osaka, Japan

[21] Appl. No.: 488,831

[22] Filed: Mar. 6, 1990

[30] Foreign Application Priority Data

| Mar. 9, 1989 [JP] | Japan | 1-26972 |
| Mar. 27, 1989 [JP] | Japan | 1-75737 |
| Mar. 31, 1989 [JP] | Japan | 1-39011 |
| May 17, 1989 [JP] | Japan | 1-56684 |

[51] Int. Cl.⁵ .................... H02J 7/00; H01M 10/46
[52] U.S. Cl. ................................. 320/2; 320/14; 320/15
[58] Field of Search ............................ 320/14, 15, 2

[56] References Cited

U.S. PATENT DOCUMENTS

| 4,016,474 | 4/1977 | Mason | 320/15 |
| 4,698,579 | 10/1987 | Richter et al. | 320/14 |

FOREIGN PATENT DOCUMENTS 61-218329  9/1986  Japan .
62-141934  6/1987  Japan .
63-116973  7/1988  Japan .

OTHER PUBLICATIONS

"Accessories That Match Your Video System to Your Shooting Style," Canon, Inc., 1987 E70 Camcorder brochure CR-E7 Charger & 2 BP-E77K Batt for E70.

Primary Examiner—R. J. Hickey
Attorney, Agent, or Firm—Armstrong & Kubovcik

[57] ABSTRACT

A battery charging apparatus, which charges a secondary battery such as an Ni-Cd battery being used for a battery-driven equipment such as a VTR camera, is provided with a first loading unit for only charging a loaded battery and a second loading unit for charging a loaded battery, for discharging the charged battery, for measuring the capacity of the discharged battery, and for displaying the measured capacity by four steps of its percentage, and which is capable of using either of the both loading units according to the qualities of the battery characteristics of the battery. In this battery charging apparatus, a new battery or a battery with good battery characteristics substantially similar to the new one are charged in the first loading unit and an old battery or a battery with inferior battery characteristics are charged in the second loading unit. The former unit can charge the battery in a shorter time and the latter one can recover the better battery characteristics by repeating the charging and discharging operation to the battery with inferior battery characteristics a few times.

9 Claims, 11 Drawing Sheets

BATTERY CHARGING APPARATUS

BACKGROUND OF THE INVENTION

1. Field of the Invention

The present invention relates to a battery charging apparatus for charging a secondary battery such as an Ni—Cd battery, and more particularly it relates to a battery charging apparatus being provided with a unit for exclusive use in charging and a unit for use in charging and discharging.

2. Description of Related Art

Recently, a cordless type of apparatus such as an 8 mm video camera has greatly been in common use, and accordingly, a secondary battery being used for its power source has also been brought into a variety of uses. When the secondary battery is generally used, plural pieces of a cell or a battery pack including more than two batteries are prepared, and after each piece of those has been exchanged to be used, those cells or battery packs are adapted to be charged to be reused. Among those plural cells or battery packs, however, depending on the time when they are purchased, there are some pieces whose battery capacity can not be recovered after they have been usually charged.

In order to avoid such inconvenience, there is disclosed an apparatus being provided with charging means and means for measuring and displaying the discharging life of a charged battery in Japanese Patent Application Laid-Open No. 62-141934.

The above prior art apparatus, after all of those cells or battery packs have been charged, discharges them in order to measure the discharging lives of those charged cells or battery packs. Among those cells or battery packs being owned by a user, there exist some which are purchased recently and are capable of fully being recovered by usual charging alone. For such cells or batteries, there is no need to repeat discharging and recharging after the usual charging.

For the above prior art apparatus, it is important that the battery pack can easily and surely be loaded or unloaded.

And it is also important to simplify the construction of the apparatus and to prevent the apparatus from being affected by a radio wave of noise from/to the outside.

SUMMARY OF THE INVENTION

The foregoing inconveniences are overcome in accordance with the present invention. It is a primary object of the invention to provide a battery charging apparatus which is provided with means for the exclusive use of charging and means for charging and discharging, and which can use either of those both means according to battery characteristics of cells or battery packs being set therein.

It is another object of the invention to provide a battery charging apparatus which can charge a battery being set in the means for the exclusive use of charging while a battery being set in the charging and discharging means is discharging, and can reduce the charging time.

It is a further object of the invention to provide a battery charging apparatus which can charge a battery in a reduced time charging preferentially the battery being set in the means for the exclusive use of charging when charging is performed in both batteries being set in both of the means for the exclusive use of charging and the means for charging and discharging.

It is a still further object of the invention to provide a battery charging apparatus in which it is extremely easy to load or unload a battery.

It is a more still further object of the invention to provide a charging apparatus which can avoid transmitting and receiving a radio wave of noise by providing a shielding plate therein.

The above and further objects and features of the invention will more fully be apparent from the following detailed description with accompanying drawings.

DESCRIPTION OF THE PREFERRED EMBODIMENTS

Now, one embodiment of the present invention will be described with reference to the accompanying drawings.

Figure 1:
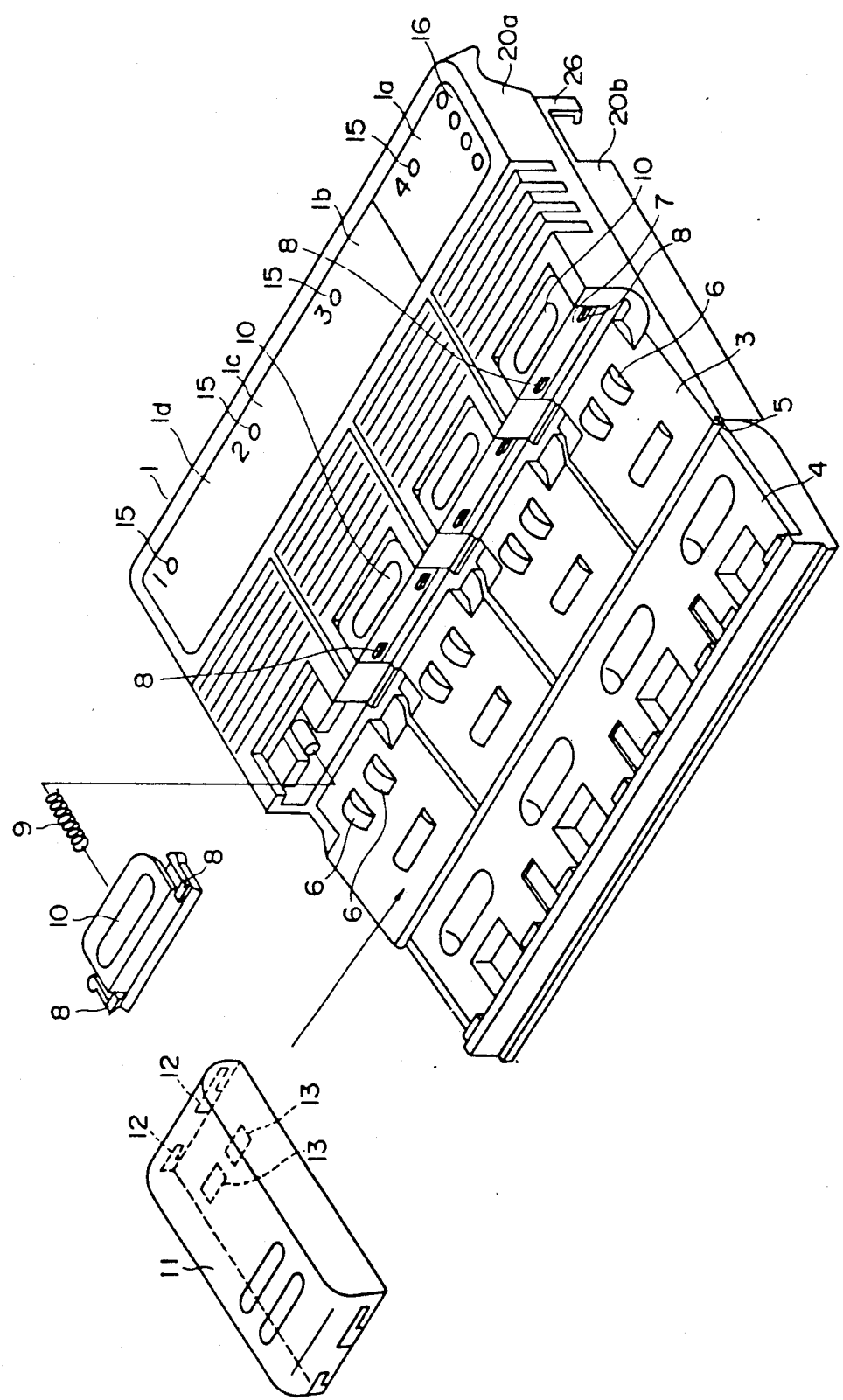
FIG. 1 is a perspective view showing both of construction of a battery charging apparatus in accordance with the present invention and a battery pack to be loaded therein.
Figure 2:
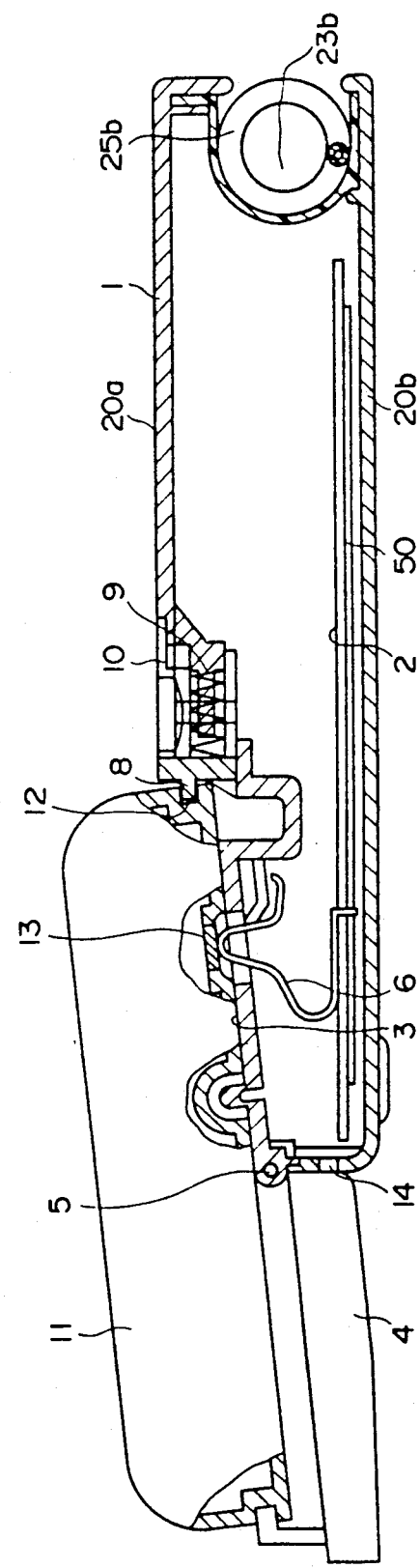
FIG. 2 is a sectional view showing the state that the battery pack is loaded in the apparatus.

FIG. 1 is a perspective view showing both of a battery charging apparatus in accordance with the present invention and a battery pack to be loaded therein, and FIG. 2 is a sectional view showing the state that the battery pack is loaded in the apparatus. In those figures, reference numeral 1 designates a body of battery charging apparatus which is made of synthetic resin such as an ABS resin, wherein there is housed a printed wiring board 2 in which various types of electric and electronic parts constituting a charging circuit are attached. The body 1 is constructed of two halves such as an upper case 20a and a lower case 20b, and approximate half of the upper surface of the body 1 is recessed to provide a loading unit 3 for loading a battery pack 11. Reference numeral 4 designates a cover body which covers the loading unit 3, is rotatably mounted to the body 1 by a hinge 5, and is opened to be used also as a part of the loading unit 3 of the battery pack 11 when the battery pack 11 is loaded in the body. A jack 14 for supplying a DC power to the outside is provided in an end surface at the side of the hinge 5 in the body 1. This jack 14 is adapted not to be used when the cover body 4 is in the opened state, that is, when the battery pack 11 is charged.

The loading unit 3 is capable of loading four battery packs thereon. The battery pack 11 is composed of six Ni—Cd batteries of 1.2 V. The loading unit 3 has on its loading surface four pairs of elastic members 6, 6 . . . which are electrically connected to the printed wiring board 2 and press the battery pack 11 upward. In a side wall 7 which divides the body 1 into the loading unit 3 and the other half portion, there are retractably formed four pairs of clicks 8, 8 . . . . Each pair of the clicks 8, 8 . . . are provided in both sides of each of four operating buttons 10 which is slidably fitted into each of recessed portions in the upper surface of the body 1 by each coil spring 9, and are adapted to be retractable by sliding movement of each of the operating buttons 10, 10 . . . .

The battery pack 11 has on its side surface a pair of recesses 12 to be engaged with a pair of said clicks 8, 8, and also has on its back surface a pair of terminals 13, 13 to be faced with a pair of said elastic members 6, 6.

Figure 3:
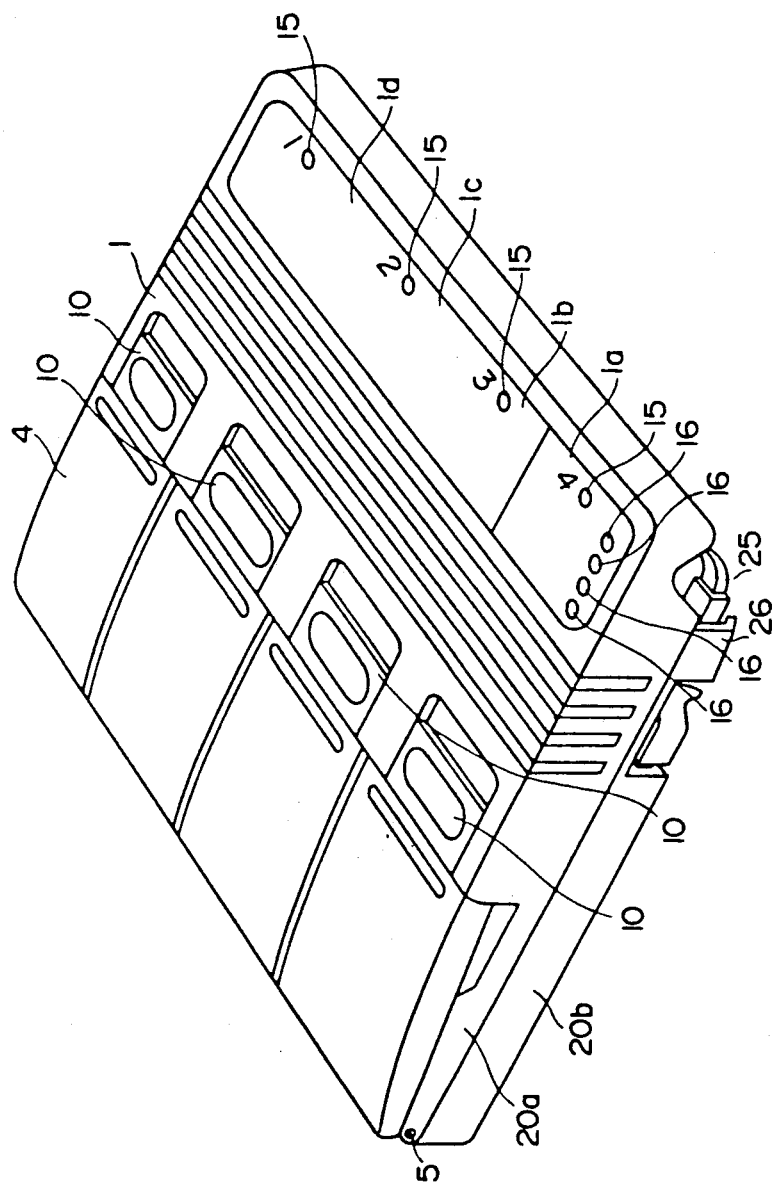
FIG. 3 is a perspective view of the battery charging apparatus of the present invention showing the state that cover body thereof is closed.

FIG. 3 is a perspective view of the battery charging apparatus of the present invention showing the state that the cover body 4 is closed. In the upper surface at the side opposite to the loading unit 3 in the body 1, there are provided four charging display lamps 15, 15 . . . at approximately equal intervals with LEDs for indicating the charging states of the four battery packs. One portion, in which one battery pack is loaded at one side of the loading unit 3 in which four battery packs 11 can be loaded, has a different function from the other portion in which other three battery packs are loaded at the other side of the loading unit 3. In other words, the portion at one side is called a charging/discharging unit 1a and the portion at the other side is three charging exclusive units 1b, 1c, and 1d. In the charging/discharging unit 1a, there are provided four discharging capacity display lamps 16, 16 . . . with LEDs in a vicinity of the charging display lamp 15. These four discharging capacity display lamps 16, 16 . . . indicate the discharging capacity after charging is completed, that is, the discharging capacity of 100, 80, 60, or 40 percent, respectively, as will be described later.

Figure 4:
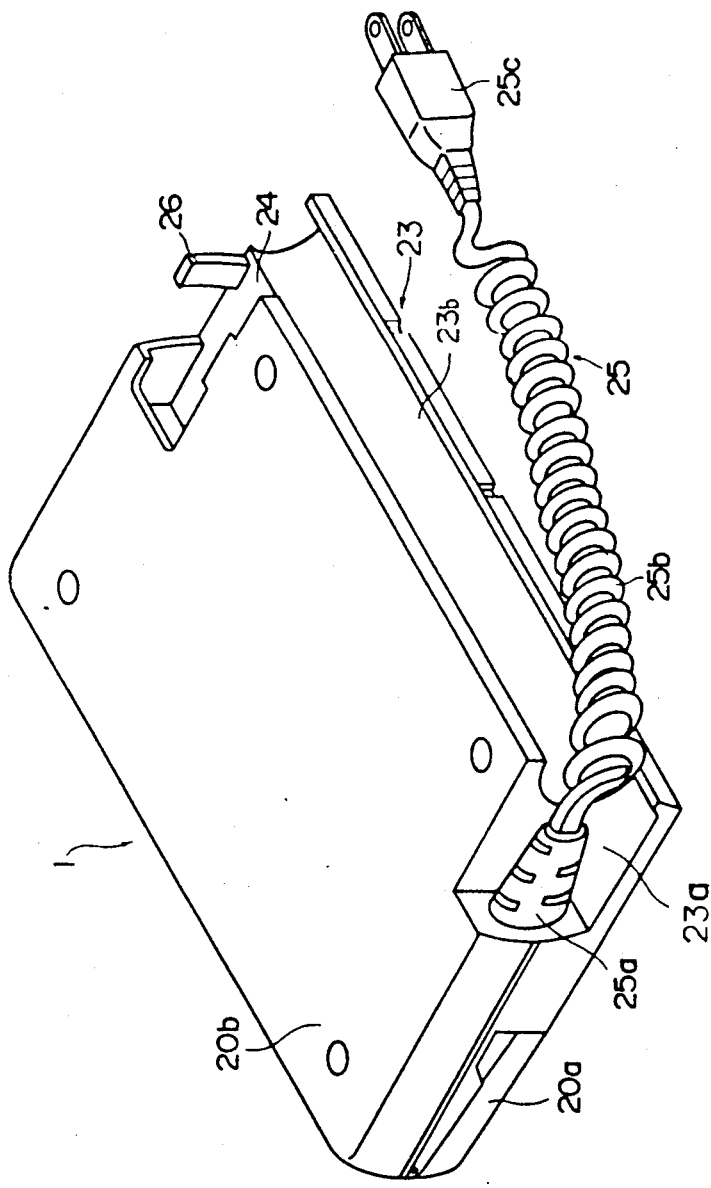
FIG. 4 is a perspective view of the battery charging apparatus of the present invention seen from its bottom.

FIG. 4 is a perspective view seen from the bottom of the battery charging apparatus of the present invention.

In the outer periphery at the side opposite to the hinge 5 in the body 1, a C-letter form concave seen from the bottom is formed on the outer peripheries of both of the upper and lower cases 20a and 20b, said C-letter form concave having a first housing portion 23 of L-letter form having a longer size and a second housing portion 24 of I-letter form having a shorter size. Both of these portions 23, 24 are formed to be in series by crossing both of the upper and lower cases 20a and 20b through the corners of the body 1. In a shorter portion 23a of the first housing portion 23, a bush portion 25a of a curl cord 25 is fixed in such a state as being put in between the upper and lower cases 20a and 20b, and in a longer portion 23b of the first housing portion 23, there is formed a wall being curved along as outline of a curl portion 25b of the curl cord 25, a diameter of the wall being set to be smaller (14 mm, for example) than a diameter (16 mm) of the outline of the curl portion 25b.

The second housing portion 24, having just the depth to be formed by the notch in the lower case 20b at most, is formed to be shallower than the shorter portion 23a of the first housing portion 23, and in the middle of its outer periphery, a locking click 26 is provided being integrated in the upper case 20a in the state standing therefrom. A plug 25c of the curl cord 25 is housed in the second housing portion 24 and is locked by the locking click 26 not to be drawn out therefrom.

Figure 5:
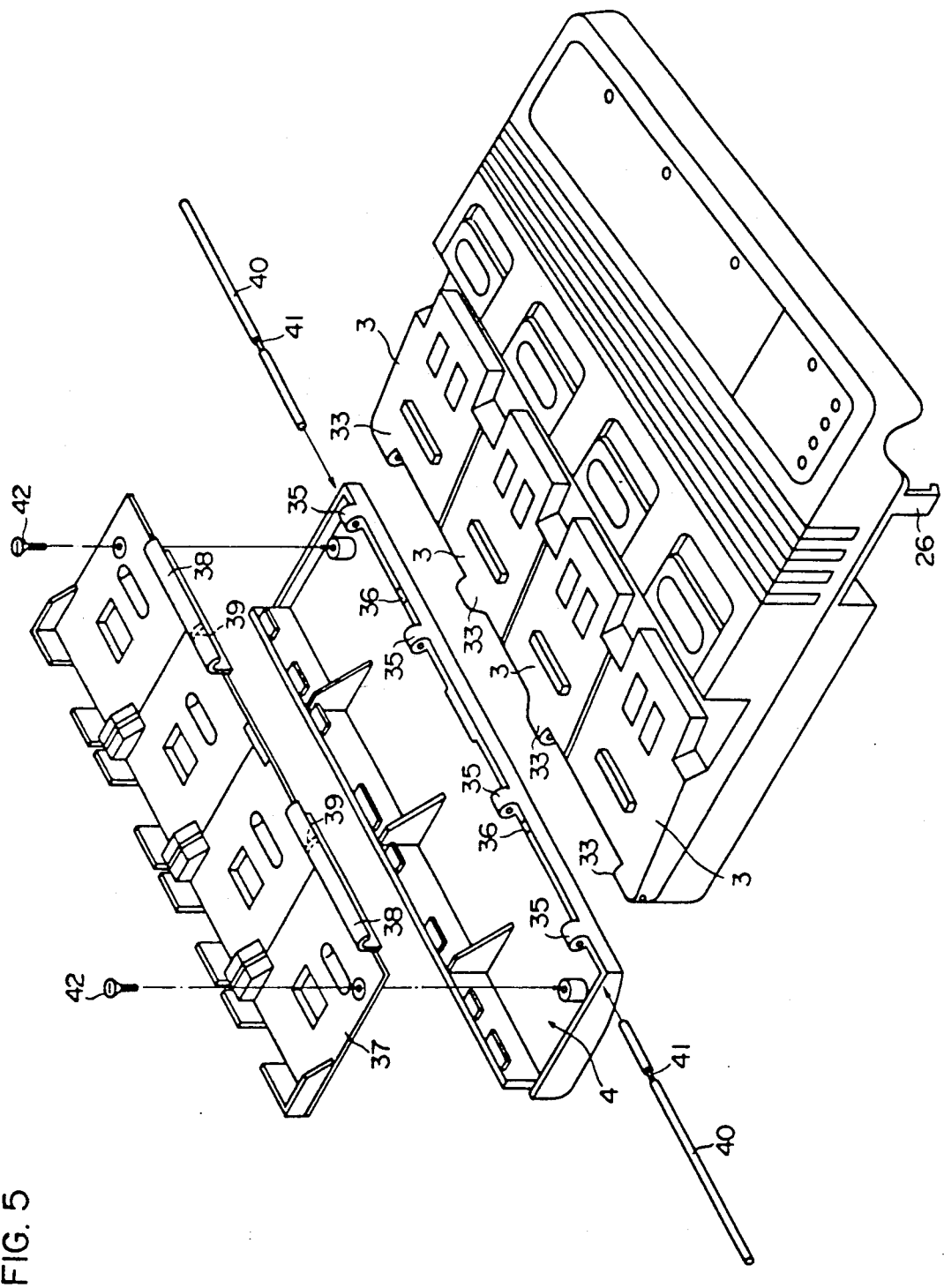
FIG. 5 is a fragmentary perspective view showing construction of mounting the cover body of the battery charging apparatus of the present invention.

FIG. 5 is a fragmentary perspective view showing construction of mounting the cover body 4 of the battery charging apparatus of the present invention. First cylindrical members 33 through which a hinge pin as will be described later passes is formed in parts of a side wall of the body 1. In parts of a side wall of the cover body 4, there are formed second cylindrical members 35 for passing the hinge pin therethrough being positioned in a space between the first cylindrical members 33, 33 being provided in the body 1, and so are projections 36 between the second cylindrical members 35, 35.

Reference numeral 37 designates an inner lid which is provided with a cover portion 38 for covering an exposed upper surface of the hinge pin after it is inserted into the first cylindrical members 33 and second cylindrical members 35, and in the inner surface of the cover portion 38, there is formed protrusions 39 in a position corresponding to the projection 36 being provided in the cover body 4.

The hinge pin designated by reference numeral 40 has in its one portion in the longitudinal direction a small diameter portion 41.

Now will be described below a method of assembling the apparatus of the invention. First, the cover body 4 is connected with the body 1 so that the second cylindrical member 35 of the cover body 4 can be positioned between the first cylindrical members 33, 33 of the body 1, and then, the hinge pin 40 is passed through hollow portions of the second cylindrical member 35 and first cylindrical member 33. As the hinge pin 40 is made of metal wire, it can easily go over the projection 36, and is set in the state that the lower part of its concave of the small diameter portion 41 can be fitted into the projection 36. And the inner lid 37 is set so that its cover portion 38 can cover the exposed upper surface of the hinge pin 40 and that the protrusion 39 can be fitted into the upper concave of the small diameter portion 41 of the hinge pin 40, then, the inner lid 37 is fixed to the cover body 4 by a screw 42.

Figure 6:
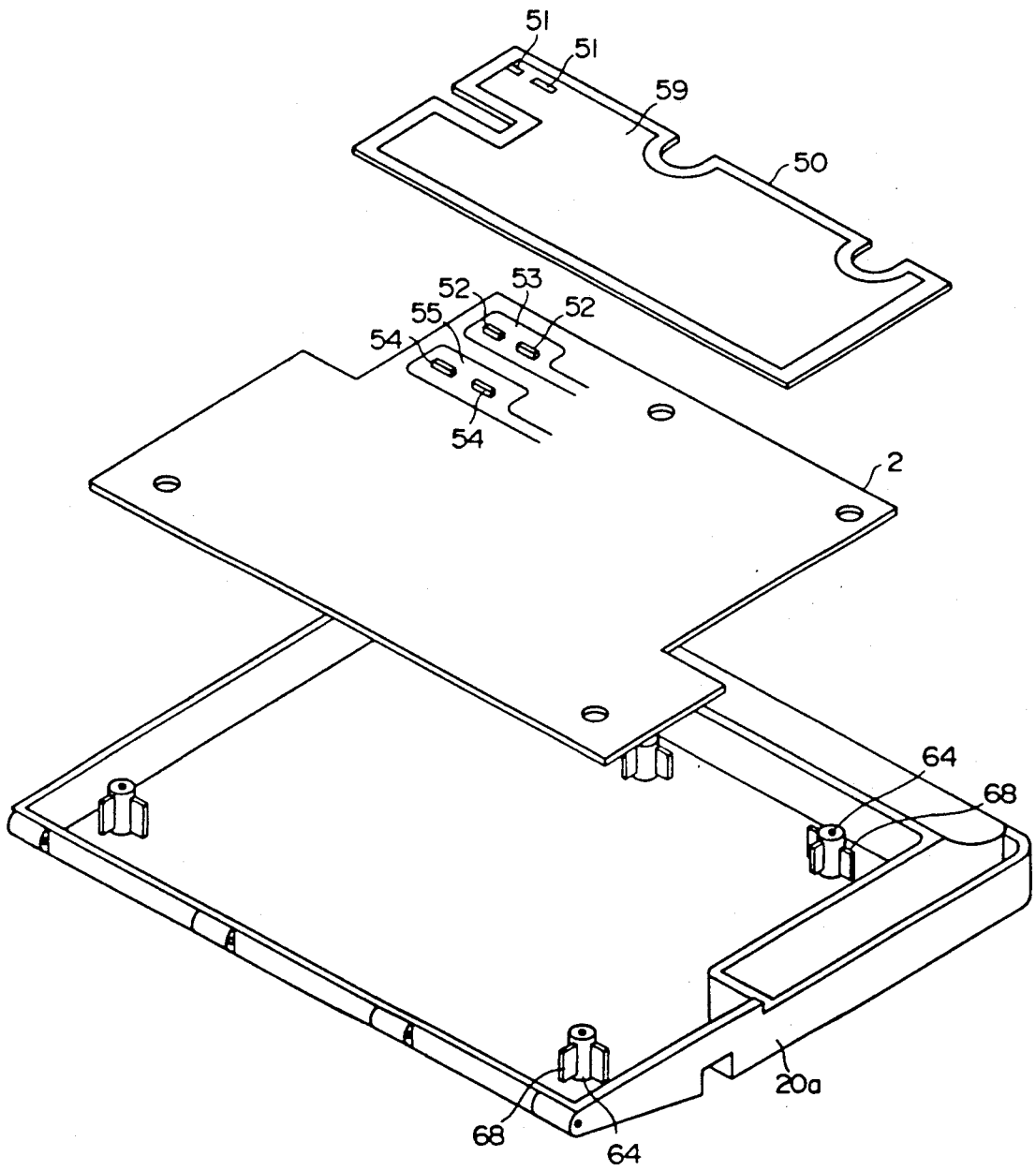
FIG. 6 is a fragmentary perspective view showing construction of mounting a printed wiring board.

FIG. 6 is a fragmentary perspective view showing construction of mounting the printed wiring board 2. In the body 1, there are provided cylindrical bosses 64, 64 being integrated in the upper case 20a in the state standing therefrom, which being threadingly engaged with an engaging element (not shown) from the side of the lower case 20b so that the upper case 20a can be connected with the lower case 20b. The printed wiring board 2 is provided on its one surface with electric parts (not shown) and printed wirings 53, 54 are arranged on the other surface. The printed wiring board 2 is fitted into the bosses 64, 64 so as to be nipped and supported between ribs 68, 68 formed as being integrated with those bosses 64, 64 and the lower case 20b. Reference numeral 50 designates an insulating sheet which works as a shielding plate, one surface of the insulating sheet 50 is printed with a coper leaf 59, and the other surface thereof is left to be the insulating surface which is positioned to be faced with the printed wiring board 2. In this insulating sheet 50, there are provided passing bores 51, 51, through which legs 52, 52 at the earth side of the electric parts being mounted to the printed wiring board 2 pass and protrude, and these protrusions are soldered with the copper leaf 59. As a result, the legs 52, 52 at the earth side of the electric parts are soldered with the printed wiring 53 in the back surface of the printed wiring board 2, and are also soldered with the copper leaf 59 of the insulating sheet 50. On the other hand, legs 54, 54 at the plus side of the electric parts are soldered with a printed wiring 55 of the printed wiring board 2 alone, and they do not pass through the insulating sheet 50.

Figure 7:
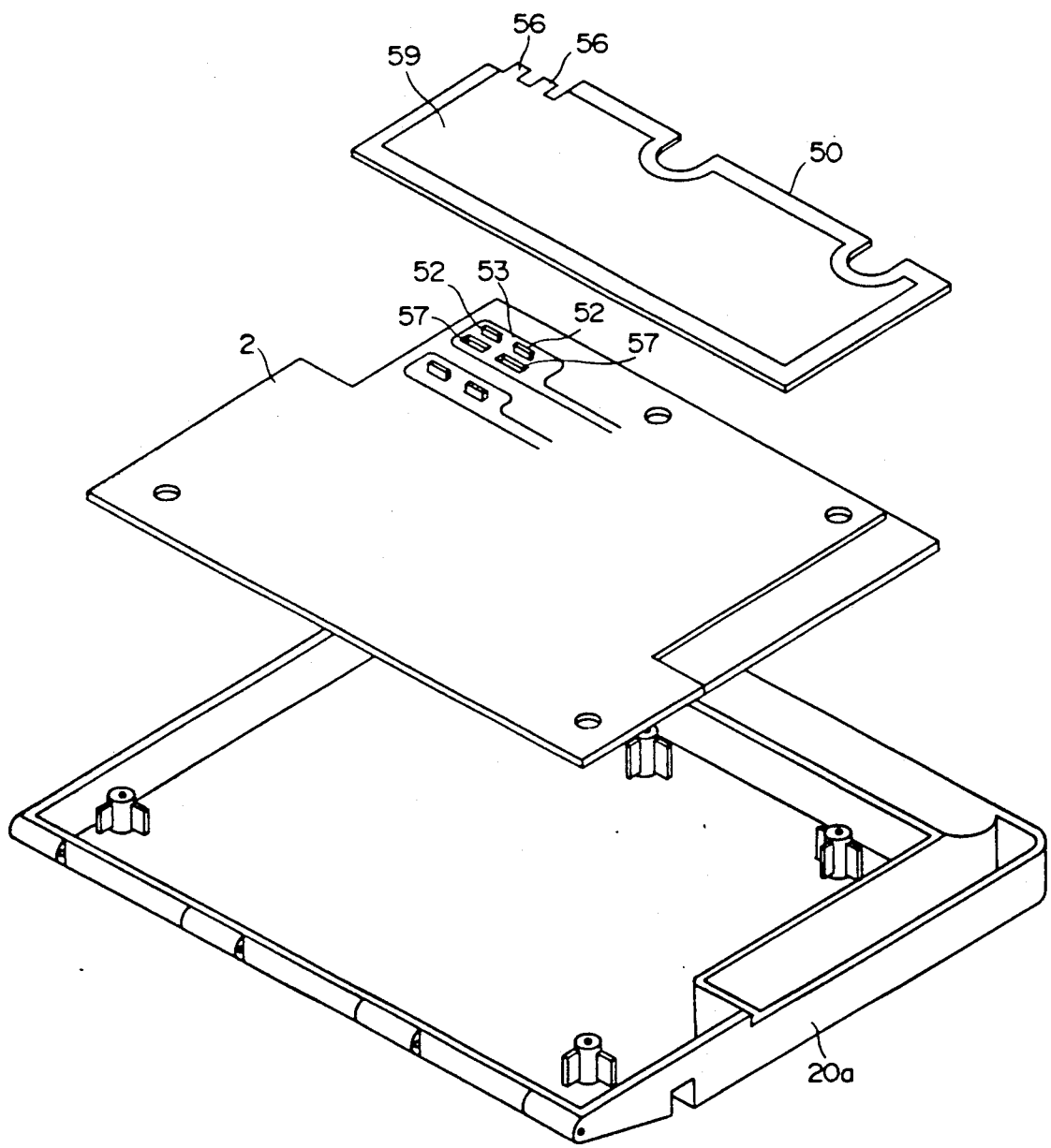
FIG. 7 is a fragmentary perspective view showing construction of mounting a printed wiring board of another embodiment.

In FIG. 7 showing construction of mounting a printed wiring board 2 of another embodiment, protruding pawls 56, 56 are formed in an insulating sheet 50, and a copper leaf 59 is extended to the tips of those protruding pawls 56, 56 so as to be printed thereon. An on the printed wiring board 2, passing bores 57, 57 are provided in a printed wiring 53 in which legs 52, 52 at the earth side of the electric parts are soldered, and the afore-mentioned protruding pawls 56, 56 of the insulating sheet 50 are inserted into these passing bores 57, 57 to be soldered thereto.

Figure 8:
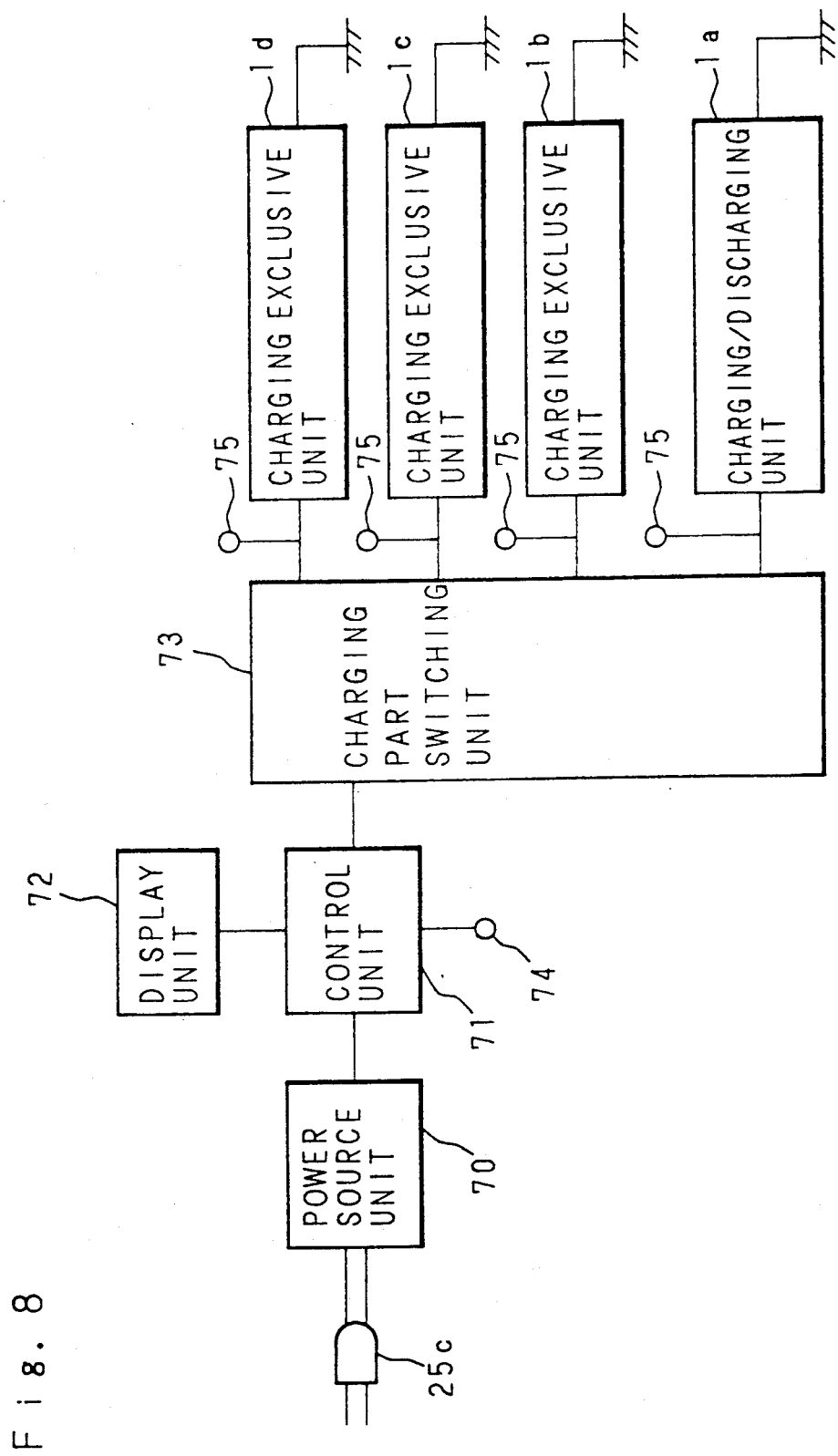
FIG. 8 is a block diagram showing construction of a control system of the battery charging apparatus of the present invention.

FIG. 8 is a block diagram showing construction of a control system of the battery charging apparatus of the present invention. An AC voltage being outputted from the plug being connected to a commercial power source (AC current) is inputted to a power source unit 70 and is converted into a DC voltage (7.5V, for example). And this converted DC voltage is inputted to a control unit 71, in which the voltage at the time of charging/discharging control and charging/discharging is detected. The control unit 71 is constructed being provided with a microprocessor including a charging/discharging circuit, a voltage measuring circuit, and a display driving circuit. The voltage being detected in the control unit 71 is transmitted to the display unit 72. This display unit 72 is comprised of charging display lamps 15, 15 ... being provided in each of those units 1a, 1b, ... and discharging capacity display lamps 16, 16 ... being provided in the charging /discharging unit 1a. A feedback unit 74 in the control unit 71 is given the voltage of the battery packs being loaded in each unit 1a, 1b, ... from each voltage feedback unit 75, 75 ... of each unit 1a, 1b ... The DC voltage which has been controlled in the control unit 71 is given to a charging part switching unit 73. This charging part switching unit 73 is provided in order to successively charge the battery packs being loaded in each of those units 1a, 1b .... The control system of the apparatus is constructed as described above.

When the battery charging apparatus of the present invention of such construction as described above is not used, the cover body 4 thereof is usually closed, or when it is used, by connecting a power source cord 25 to a commercial AC current, a DC current is generated in a jack 14 (it is unusable because it is covered when the cover body is opened) being provided in one side surface of the body 1, which current being capable of working other electric equipment such as a radio or a cassette tape recorder.

When the battery is charged, the cover body 4 is opened, and by pressing the battery pack 11 against the loading unit as shown in FIG. 2, the click 8 is retracted, and after the battery pack 11 abuts the loading surface, the click 8 protrudes to be engaged with the recess 12 of the battery pack 11, thereby the battery pack 11 being fixed to the loading surface and the elastic member 6 being used also for their point of contact abuts a terminal 13 of the battery pack 11. Charging, thus, is to be started in this state.

Figure 9:
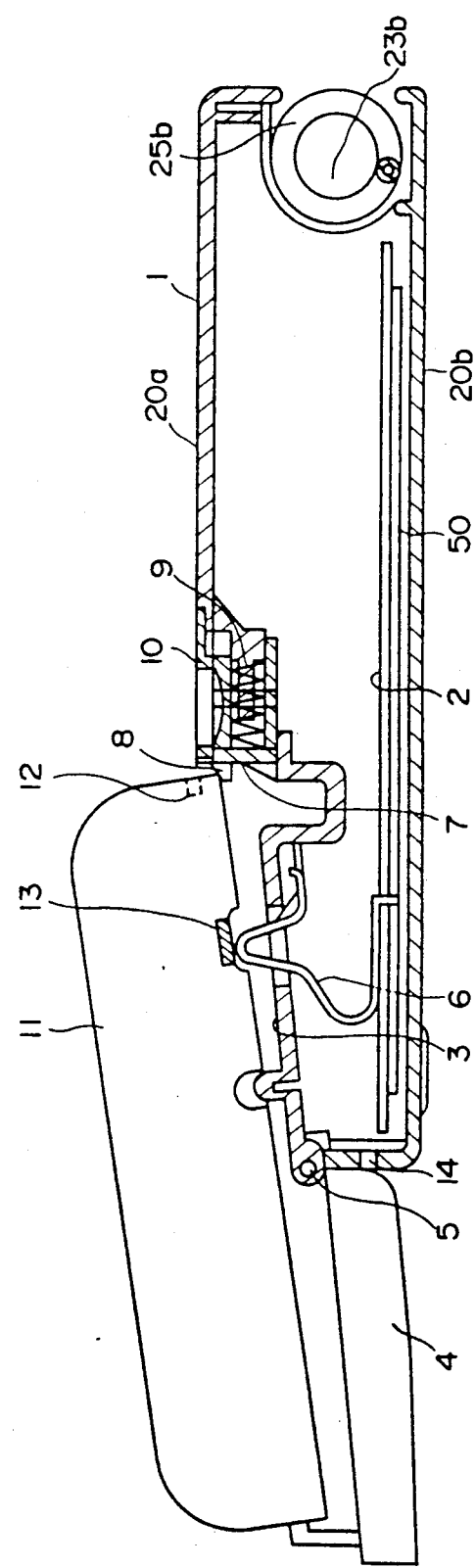
FIG. 9 is a sectional view for explaining the way of unloading the battery pack.

Next, when the battery pack 11 is unloaded from the loading unit, the operating button 10 is slided backward as shown in FIG. 9, and the click 8 is retracted to be disengaged, then, the battery pack 11 is lifted up by the biasing force of the elastic member 6 to be easily unloaded from the loading unit.

Once the battery pack 11 has been lifted up, it is not liable to be loaded again by mistake by the biasing force of the elastic member 6 unless it is pressed again.

And as shown in the embodiment, using elastic member also for the point of contact reduces pieces of parts being used in the apparatus, which is advantageous.

Figure 10:
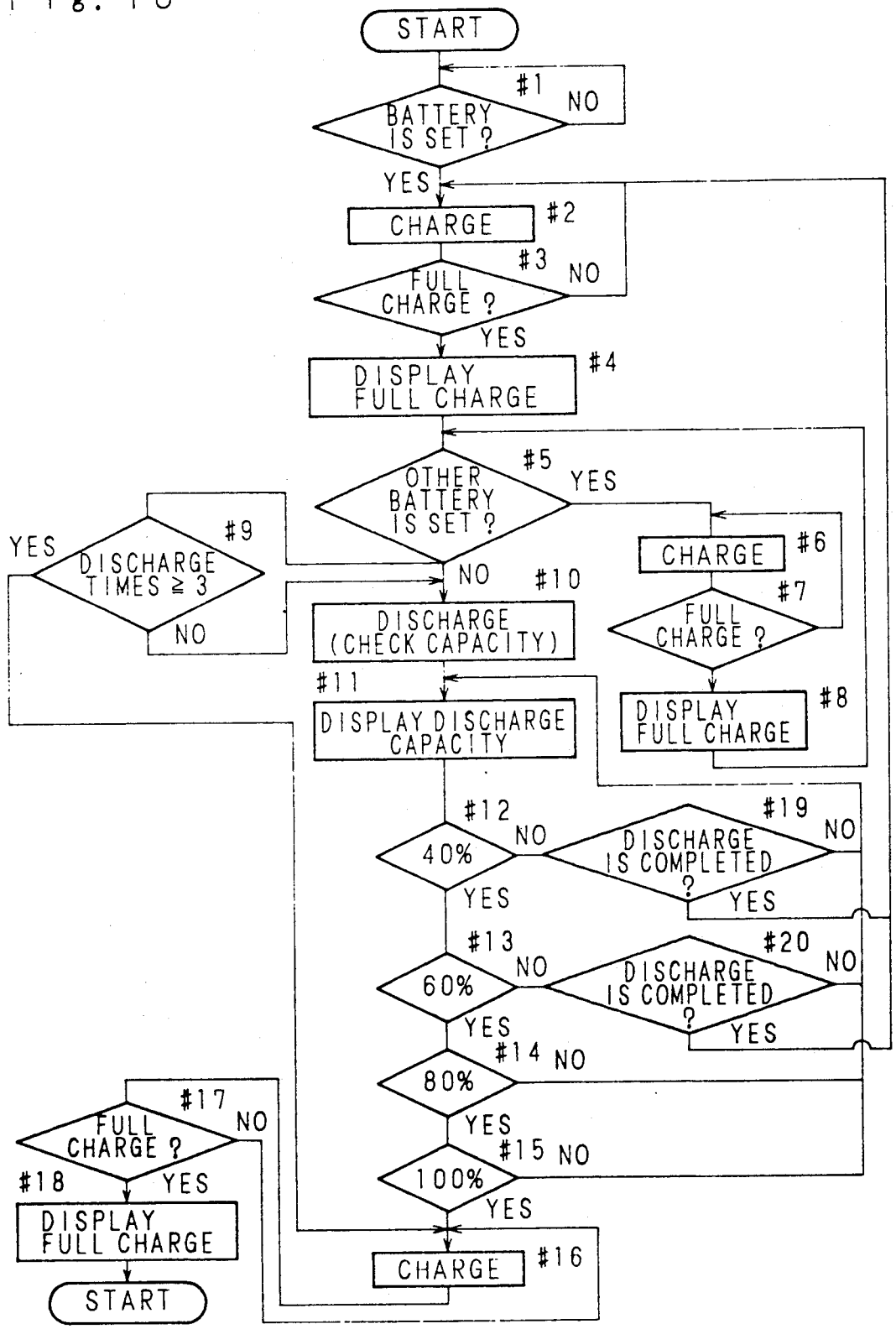
FIG. 10 is a flow chart showing the content of control operations for charging and discharging.

Now will be described below control operation for charging/discharging. FIG. 10 is a flow chart showing the content of the control operation for charging/discharging.

When the power source cord is connected with an AC power source, the apparatus starts and, first, it judges whether the battery pack 11 is set or not (Step #1). And where the battery pack 11 is set in either of the units 1a, 1b, ..., the apparatus starts charging, and the charging display lamp 15, 15 ... in the unit 1a, 1b, ... is flashed to indicate its charging stat (Step #2). And at the same time, it is always checked whether the loaded battery pack 11 is fully charged or not (Step #3). And when the battery pack 11 is fully charged, the charging display lamp 15, 15 ... is lit to indicate that the charging has completed (Step #4). And it is judged whether the battery pack 11 is set in the other unit 1a, 1b, ... or not (Step #5), and where the battery pack 11 is set there, the same charging operation as described above is carried out (Steps #6-8). And where battery packs 11 are set in all of those units 1a, 1b, 1c and 1d, those packs are adapted to be charged in this order from 1d, 1c, 1b and 1a.

Where charging of all the battery packs 11 being set in the charging exclusive units 1b, 1c and 1d are completed, or where the battery pack 11 is set only in the charging/discharging unit 1a, after charging of the battery pack 11 being set in the charging/discharging unit 1a is completed, it is judged whether it has been discharged three times or more (Step #9), and if not, discharging is started (Step #10). The charging display lamp 15 in the charging/discharging unit 1a is flashing while the battery pack 11 is being charged, however, after the charging is completed, or after charging is completed if the charging is performed before discharging, the charging display lamp 15 is turned off, which function being different from the charging display lamps 15 in the other units. When discharging is performed, the discharging capacity until the battery voltage per one battery cell reaches to 1V is indicated by four steps such as 40%, 60%, 80%, and 100% corresponding to the lighting number of four discharging capacity display lamps 16, 16 .... Until the discharging capacity reaches each of those four values, the lamp indicating the value lower than its own value flashes, and when discharging is completed, all of the other lamps indicating values below that of the flashing lamp are turned on (Step #12-15).

Among those discharging capacity display lamps, when it is detected that the lamp indicating at least 80 percent of its discharging capacity is lit, the final charging is to be performed (Step #16), and during that time, the charging display lamp 15 flashes and it is checked whether the battery is fully charged or not (Step #17). When it is fully charged, the charging display lamp 15 is lit to indicate that the full charging is completed (Step #18).

And where the discharging capacity display lamp indicating 60 percent is not lit, that is, discharging capacity does not reach the value 60 percent, after it is checked that discharging is completed in Step #19 or #20, the operation goes back to Step #2 to perform the charging and discharging again. This recharging and redischarging is repeated twice at most and where this is identified to be a third charging and discharging at Step #9, the final full charging at Step #16 is performed to complete the full charging.

Recharging and redischarging is to be repeated twice according to the following reason. That is, when an Ni—Cd battery is employed as a secondary battery, if this battery is used under such a condition as repeating light charging and discharging, there is seen a phenomenon that the voltage at discharging becomes lower. The reason why that phenomenon is seen is not clearly told, however it is thought that the light charging and discharging makes one portion of an electrode active material unused for a long period of time, which allows the portion to be inactive.

When the Ni—Cd battery is employed, its discharging end voltage is generally set to be 1.0 V to 1.2 V per one battery cell, and where the voltage at discharging becomes lower, which results in making the life of the battery shorter.

This phenomenon, that the voltage at discharging becomes lower by using the battery under such a condition as repeating the light charging and discharging, is called the memory effect, which, however, normally is completely recovered by repeating heavy charging and discharging a few times.

Accordingly, the apparatus of the invention is adapted to repeat recharging and redischarging twice, and as the battery pack in which third recharging and redischarging is performed has not enough capacity, taking that into consideration, a user must use the battery pack.

Figure 11:
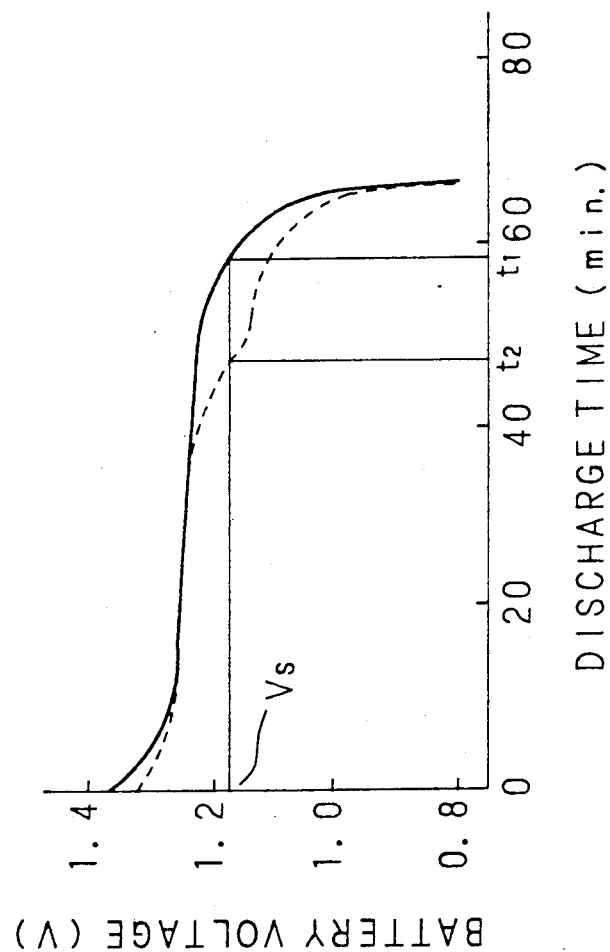
FIG. 11 is a graph for explaining the memory effect.

FIG. 11 is a graph showing characteristics of the Ni—Cd battery for explaining such memory effect as described above, and a vertical line in the graph shows a battery voltage (V), so does the horizontal line a discharging time (min), respectively.

In the graph, the full line shows general characteristics of discharging voltage of the Ni—Cd battery, and the broken line shows characteristics of discharging voltage after repeating the charging and discharging cycle, which is comprised of discharging to obtain the state that the battery is not completely discharged but with some battery capacity being left, that is, discharging under the state that the discharging end voltage can be Vs, and charging to obtain the state that the battery is fully charged.

As can be clearly seen from the graph, in comparison with the full line, the broken line shows that discharging time to obtain the state that the discharging end voltage can be Vs is shorter. This phenomenon, however, can normally be dissolved by repeating a few times of the complete discharging and full charging as mentioned above.

In the apparatus of the present invention, where battery packs are set in the charging exclusive unit and the charging/discharging unit, those packs are successively charged, among which the battery pack being set in the charging/discharging unit is adapted to be charged last.

In addition, when the battery pack being set in the charging/discharging unit is discharged, a battery pack being set in the charging exclusive unit is adapted to be chargeable.

As mentioned above, since the battery charging apparatus of the present invention is provided with other various types of functions in addition to both of the charging exclusive unit and the charging/discharging unit, the apparatus can perform proper charging according to the conditions of the battery or the battery pack to be charged, which is a great industrial value.

According to the present invention, there are provided the elastic members which always press the battery pack upward against the loading surface of the loading unit of the battery pack, and there are retractably formed in the side wall of the loading unit the clicks to be engaged with the concave being provided in the side surface of the battery pack. Therefore, loading and unloading operation of the battery pack is extremely easy, and when the battery pack is unloaded, once the battery pack is lifted up, it is not liable to be reloaded by mistake by the biasing force of the elastic members unless it should be pressed again, thus, the battery charging apparatus of extremely good operation can be provided.

Furthermore, since a conductive leaf being provided on one surface of the insulating sheet is soldered with the printed wiring being provided at the earth side of the printed wiring board, the insulating sheet works as a shield plate so as to avoid influence from a radio wave of noise.

As this invention may be embodied in several forms without departing from the spirit of essential characteristics therefore, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A battery charging apparatus comprising:

a housing;

at least one first loading means on said housing, for receiving a battery therein, said battery thereby becoming a first-loaded battery;

at least one second loading means on said housing, for receiving a battery therein, said battery thereby becoming a second-loaded battery;

first charging means coupled to said at least one first loading means for only charging said first-loaded battery loaded therein;

second charging means coupled to said at least one second loading means for charging said second-loaded battery loaded therein;

preferential charging means coupled to said first and second charging means for preferentially charging said first-loaded battery loaded in said first loading means when first and second loading means have batteries loaded therein, such that said first loading means stops charging and said second loading means starts charging when a battery voltage of said first-loaded battery reaches a predetermined level;

discharging means coupled to said second charging means for discharging said second-loaded battery in said second loading means;

measuring means coupled to said first and second loading means for measuring capacity of batteries loaded therein;

control means coupled to said first and second charging means, said preferential charging means, said discharging means, and said measuring means, said control means for controlling the charging and discharging of batteries loaded in said first and second loading means;

first display means coupled to said measuring means; wherein said control means controls said second charging means to charge said second loaded battery to a predetermined level, said discharging means to discharge said second-loaded battery after, charging, said first charging means to charge said first loaded battery while said discharging means discharges said second loaded battery, said measuring means to measure the capacity of the discharged battery, and said display means to display a value related to the measured capacity.

2. A battery charging apparatus as set forth in claim 1, wherein a plurality of first loading units are provided.

3. A battery charging apparatus as set forth in claim 1, wherein each of said first and second loading means further comprises second display means for indicating that charging is completed.

4. A battery charging apparatus as set forth in claim 1, wherein said first display means further comprises a plurality of LEDs whose lighting number corresponds to a measured battery capacity.

5. A battery charging apparatus as set forth in claim 3, wherein said second display means comprises LEDs.

6. A battery charging apparatus, comprising:
a housing;
at least one first loading means on said housing, for receiving a battery;
at least one second loading means on said housing for receiving a battery, said batteries including a recess located on a side wall thereof;
wherein each of said first and second loading means includes
 a) a loading surface,
 b) an elastic member on said loading surface for pressing a battery against the direction crossing said loading surface,
 c) a projection retractably disposed on said loading surface to engage said recess formed on engages with a concave formed on one said battery;
first charging means coupled to said at least one first loading means for only charging the battery loaded therein;
second charging means coupled to said at least one second loading means for charging the battery loaded therein;
preferential charging means coupled to said first and second charging menas for preferentially charging a battery loaded in said first loading means when first and second loading means have batteries loaded therein;
discharging means coupled to said second charging means for discharging said battery in said second loading means;
measuring means coupled to said second loading means for measuring capacity of a battery;
control means coupled to said first and second charging means, said preferential charging means, said discharging means, and said measuring means, said control means for controlling the charging and discharging of batteries located in said first and second loading means;

first display means coupled to said measuring means;
wherein said control means controls said second charging means to charge said battery to a predetermined level, said discharging means to discharge said battery after charging, said measuring means to measure the capacity of the discharged battery, and said display means to display a value related to the measured capacity.

7. A battery charging apparatus as set forth in claim 6, wherein said elastic member includes a terminal to supply a voltage for charging to said battery.

8. A battery charging apparatus as set forth in claim 1, further comprising noise shielding means for avoiding transmitting and receiving a radio wave noise to and from the outside.

9. A battery charging apparatus, comprising:
a housing;
at least one first loading means on said housing, for receiving a battery;
at least one second loading means on said housing for receiving a battery, said batteries including a recess located on a side wall thereof;
first charging means coupled to said at least one first loading means for only charging the battery loaded therein;
second charging means coupled to said at least one second loading means for charging the battery loaded therein;
preferential charging means coupled to said first and second charging means for preferentially charging a battery loaded in said first loading means when said first and second loading means have batteries loaded therein;
discharging means coupled to said second charging means for discharging the battery in said second loading means;
measuring means coupled to said second loading means for measuring capacity of a battery;
control means coupled to said first and second charging means, said preferential charging means, said discharging means, and said measuring means, said control means for controlling the charging and discharging of batteries located in said first and second loading means;
first display means coupled to said measuring means;
wherein said control means controls said second charging means to charge said battery to a predetermined level, said discharging means to discharge said battery after charging, said measuring means to measure the capacity of the discharged battery, and said display means to display a value related to the measured capacity;
wherein said first and second loading means further comprise
 a) a body having one side wall with first cylindrical members;
 b) a cover body having one side wall with second cylindrical members positioned in a space between said first cylindrical members, said cover body having a projection formed thereon;
 c) a hinge pin having a reduced diameter portion thereon, which passes through said first and second cylindrical members which are coaxially disposed; and
 d) an inner lid with a cover portion for covering an upper side of an exposed surface of said hinge pin, said cover portion having a protrusion formed thereon, wherein said hinge pin passes through said coaxially disposed first and second cylindrical members whereby said cover body is swingably mounted to said body of said first and second loading means, and said projection on said cover body and said protrusion on said cover portion engage said reduced diameter portion of said hinge pin to prevent lateral movement thereof.

* * * * *

UNITED STATES PATENT AND TRADEMARK OFFICE
CERTIFICATE OF CORRECTION

PATENT NO. : 5,119,008
DATED : June 2, 1992
INVENTOR(S) : MORITA et al

It is certified that error appears in the above-identified patent and that said Letters Patent is hereby corrected as shown below:

Column 9, claim 6, lines 47-48, delete [engages with a concave formed on one].

Signed and Sealed this

Twentieth Day of July, 1993

Attest:

MICHAEL K. KIRK

Attesting Officer

Acting Commissioner of Patents and Trademarks